(12) United States Patent
Ogawa

(10) Patent No.: US 6,455,867 B2
(45) Date of Patent: Sep. 24, 2002

(54) IMAGE DETECTOR HAVING PHOTOCONDUCTIVE LAYER, LINEAR ELECTRODES TRANSPARENT TO READING LIGHT, AND SIGNAL-READOUT ELECTRODES SHADED FROM READING LIGHT

(75) Inventor: Masaharu Ogawa, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 2 days.

(21) Appl. No.: 09/822,498

(22) Filed: Apr. 2, 2001

(30) Foreign Application Priority Data

Mar. 31, 2000 (JP) .......................... 2000-098721

(51) Int. Cl.[7] ............................ G01T 1/16; G01N 23/04
(52) U.S. Cl. .......................................... 250/580; 250/591
(58) Field of Search ................................ 250/580, 581, 250/585, 591, 370.01, 370.08, 370.09, 370.11, 370.12, 484.2, 586; 257/431; 378/25, 31; 347/122; 358/400; 369/101; 396/661; 430/57.8

(56) References Cited

U.S. PATENT DOCUMENTS

| | | | |
|---|---|---|---|
| 4,535,468 A | * 8/1985 | Kempter | 250/213 |
| 4,539,591 A | * 9/1985 | Zermeno et al. | 358/335 |
| 4,778,985 A | * 10/1988 | Modisette et al. | 250/213 |
| 4,788,426 A | * 11/1988 | Kuehnle | 250/327.2 |
| 5,268,569 A | 12/1993 | Nelson et al. | 250/214 LA |
| 5,925,890 A | 7/1999 | Van Den Bogaert et al. | 250/580 |
| 5,965,897 A | * 10/1999 | Elkind et al. | 250/370 |
| 6,268,614 B1 | * 7/2001 | Imai | 250/591 |

FOREIGN PATENT DOCUMENTS

| | | | |
|---|---|---|---|
| EP | 0 989 730 A2 | 3/2000 | H04N/1/00 |
| EP | 1 041 400 A2 | 10/2000 | G01T/1/24 |
| EP | 1 041 401 A2 | 10/2000 | G01T/1/29 |
| JP | 9-5906 | 1/1997 | G03B/42/02 |
| JP | 11-207283 | 8/1999 | B09B/1/00 |
| JP | 2000-162726 | 6/2000 | G03B/42/02 |
| JP | 2000-209529 | 7/2000 | H04N/5/76 |
| JP | 2000-284056 | 10/2000 | G01T/1/24 |
| JP | 2000-284057 | 10/2000 | G01T/1/24 |
| WO | 98/59261 | 12/1998 | G01T/1/24 |

* cited by examiner

Primary Examiner—Constantine Hannaher
Assistant Examiner—Otilia Gabor
(74) Attorney, Agent, or Firm—Sughrue Mion, PLLC

(57) ABSTRACT

An image detector includes a recording-side photoconductive layer, a reading-side photoconductive layer, a charge storage region, and a pair of electrode layers. One of the pair of electrode layers located near to the reading-side photoconductive layer comprises a plurality of first linear electrodes transparent to reading light, and a plurality of second linear electrodes each of which corresponds to at least one first linear electrode, and outputs an electric signal corresponding to the amount of latent-image charges when the at least one first linear electrode is scanned with the reading light. The image detector further includes means for making the strength of irradiation of each second linear electrode with the reading light smaller than the strength of irradiation of at least one first linear electrode corresponding to the second linear electrode with the reading light.

6 Claims, 2 Drawing Sheets

X-Z CROSS SECTION

X-Y CROSS SECTION

X-Z CROSS SECTION

WIDTH OF 1 PIXEL

X-Y CROSS SECTION

IMAGE DETECTOR HAVING PHOTOCONDUCTIVE LAYER, LINEAR ELECTRODES TRANSPARENT TO READING LIGHT, AND SIGNAL-READOUT ELECTRODES SHADED FROM READING LIGHT

CROSS-REFERENCE TO RELATED APPLICATIONS

The subject matters disclosed in this specification are related to the subject matters disclosed in the following copending, commonly-assigned U.S. patent applications:

(1) U.S. Ser. No. 09/404,371 filed by Shinji Imai on Sep. 24, 1999 and entitled "READ-OUT APPARATUS FOR AN IMAGE DETECTOR," corresponding to Japanese patent application Nos. 10(1998)-271374 and 11(1999)-242876, the latter of which is disclosed in Japanese Unexamined Patent Publication No. 2000-162726; now U.S. Pat. No. 6,376,857 issued Apr. 23, 2002.

(2) U.S. Ser. No. 09/539,412 filed by Masaharu Ogawa (the inventor of the present application), Shinji Imai, and Toshitaka Agano on Mar. 30, 2000 and entitled "RADIATION SOLID-STATE DETECTORS, AND RADIATION IMAGE RECORD-READING METHOD AND DEVICE USING THE SAME," corresponding to Japanese patent application No. 11(1999)-87922, which is disclosed in Japanese Unexamined Patent Publication No. 2000-284056;

(3) U.S. Ser. No. 09/538,479 filed by Shinji Imai on Sep. 24, 1999 and entitled "SOLID-STATE RADIOGRAPHIC IMAGE DETECTORS," corresponding to Japanese patent application No.11(1999)-89553, which is disclosed in Japanese Unexamined Patent Publication No. 2000-284057; and (4) U.S. Ser. No. 09/620,707 filed by Masaharu Ogawa (the inventor of the present application) on Jul. 20, 2000 and entitled "SOLID-STATE RADIOGRAPHIC IMAGE DETECTOR," corresponding to Japanese patent applications Nos. 11(1999)-207283 and 2000-209529.

The contents of the above copending, commonly-assigned U.S. patent applications (1) to (4) and the corresponding Japanese patent applications are incorporated in this specification by reference.

BACKGROUND OF THE INVENTION

1. Field of the Invention

The present invention relates to an image detector having a recording-side photoconductive layer, a reading-side photoconductive layer, and stripe electrodes. In the image detector, an electrostatic latent image is temporarily recorded by applying recording light to the recording-side photoconductive layer, and the recorded electrostatic latent image is reading out through the stripe electrodes by applying reading light to the reading-side photoconductive layer.

2. Description of the Related Art

Conventionally, various apparatuses such as facsimile apparatuses, copiers, radiographic imaging apparatuses use image detectors. Some radiographic imaging apparatuses designed for medical applications use as an image detector an optical-reading type solid-state radiographic image detector (or an optically readable electrostatic recording medium which records radiographic images), which comprises a photoconductive body (layer) made of a material exhibiting conductivity in response to exposure to radiation such as X rays. For example, the photoconductive body (layer) is a selenium plate. In the above radiographic imaging apparatuses, recording electromagnetic radiation (which may be called recording light) is applied to the solid-state radiographic image detector, so that charges having a polarity (hereinafter called a latent-image polarity), out of the charges (pairs of opposite charges) generated in the photoconductive body (layer) by the exposure to the recording electromagnetic radiation, are stored as latent-image charges in a charge storage region of the solid-state radiographic image detector, and the amount of the latent-image charges stored in each area (corresponding to a pixel) of the charge storage region corresponds to the exposure dose of the recording electromagnetic radiation in the area. Thus, radiographic image information is recorded in the form of a latent image. Thereafter, a reading-side electrode layer of the solid-state radiographic image detector is scanned with reading electromagnetic radiation (which may be called reading light) so that the amount of signal charges corresponding to the latent-image charges recorded in each area of the solid-state radiographic image detector is detected in the form of an electric signal (current). Thus, the recorded radiographic image information is read out. Typically, the above recording electromagnetic radiation is realized by X rays, and the above reading electromagnetic radiation is realized by a laser beam or a line-shaped light band. The above radiographic imaging technique is disclosed in U.S. Pat. No. 5,268,569, International Patent Publication WO-A1-98/59261, and Japanese Unexamined Patent Publication Nos. 9(1997)-5906, 2000-162726, 2000-284056, and 2000-284057. The contents of the above patent publications are incorporated by reference in the present patent application.

In particular, the Japanese Unexamined Patent Publication Nos. 2000-162726, 2000-284056, and 2000-284057 disclose solid-state radiographic image detectors which are constructed by forming a recording-side electrode layer (first electrode layer), a recording-side photoconductive layer, a charge transport layer, a reading-side photoconductive layer, and a reading-side electrode layer (second electrode layer) in this order so that a charge storage region is realized between the recording-side photoconductive layer and the charge transport layer. The recording-side electrode layer (first electrode layer) is transparent to recording light. The recording-side photoconductive layer generates charges and exhibits conductivity when the recording-side photoconductive layer is exposed to the recording light which has passed through the recording-side electrode layer. The charge transport layer behaves as almost an insulator against charge carriers having the latent-image polarity (i.e., the same polarity as the latent-image charges), and behaves as almost a conductor of charge carriers having the opposite polarity to the latent-image polarity (which is hereinafter called a transport polarity). The charges having the transport polarity are called transport charges. The reading-side photoconductive layer generates charges and exhibits conductivity when the reading-side photoconductive layer is exposed to reading light. The reading-side electrode layer (second electrode layer) is transparent to the reading light. When the reading light is applied to the reading-side photoconductive layer through the reading-side electrode layer, the electric signal corresponding to the amount of the latent-image charges stored in each area of the charge storage region is detected through the reading-side electrode layer.

In addition, the Japanese Unexamined Patent Publication Nos. 2000-162726, 2000-284056, and 2000-284057 disclose techniques for detecting the amount of signal charges. According to the disclosed techniques, the reading-side electrode layer includes a striped (or comb) electrode array comprised of a number of linear electrodes which are elongated in the feeding direction in the scanning of the reading-side photoconductive layer with the reading light, and arranged parallel to each other. The linear electrodes are respectively connected to detection amplifiers. The reading light has a cross section of a line shape elongated in the main scanning direction, which is perpendicular to the feeding direction, and is moved in the feeding direction for scanning the entire area of the reading-side photoconductive layer through the reading-side electrode layer. The above technique for detecting the amount of signal charges is called a line-reading-out method.

According to the above line-reading-out method, the amounts of signal charges corresponding to pixels of the reading-side photoconductive layer located on each line in the main scanning direction are concurrently read out. Therefore, the reading speed can be increased. In addition, since the reading-side electrode layer is divided into the linear electrodes, the distributed (load) capacitance of each detection amplifier decreases, and therefore the S/N ratio can be increased. Further, since the positions in which the latent-image charges are stored can be fixed to the positions in which the linear electrodes are arranged, the structural noise can be reduced. That is, the line-reading-out method has various advantages.

Further, the Japanese Unexamined Patent Publication Nos. 2000-284056 and 2000-284057 disclose an image detector in which linear charging electrodes (linear charge-read-out electrodes) are arranged parallel to the linear electrodes constituting the striped electrode array so that the linear charging electrodes can be used in the operation of detecting the amount of the latent-image charges in the form of the electric signal. Hereinafter, the linear electrodes constituting the striped electrode array may be called light-entrance electrodes.

When the linear charging electrodes are arranged as above, additional capacitors are formed between the charge storage region and the respective linear charging electrodes, and it is therefore possible to store the transport charges in the linear charging electrodes by charge rearrangement before reading out the electric signal corresponding to the amount of the latent-image charges, where the transport charges have the opposite polarity to that of the latent-image charges stored in the charge storage region by the recording. Therefore, the amounts of the transport charges distributed to the capacitors which are formed between the charge storage region and the light-entrance electrodes can be decreased by the provision of the linear charging electrodes. Accordingly, the amount of signal charges detected by the image detector can be increased, and thus the readout efficiency can be increased. Further, the above advantage of the provision of the linear charging electrodes and the advantages (e.g., the great responsiveness) of the provision of the striped electrode array can coexist.

Furthermore, when the transmittance of the reading light through the light-entrance electrodes is small, the amount of the reading light entering the reading-side photoconductive layer becomes insufficient. In addition, when the transmittance of the reading light through the linear charging electrodes is great, the linear charging electrodes also function as light-entrance electrodes, and the amount of the signal charges detected through the linear charging electrodes may decrease. The commonly-assigned U.S. patent application Ser. No. 09/620,707 corresponding to Japanese patent application Nos. 11 (1999)-207283 and 2000-209529 discloses a condition of transmittances and widths of the linear charging electrodes and the light-entrance electrodes for making the amount of light entering the reading-side photoconductive layer through the light-entrance electrodes greater than the amount of light entering the reading-side photoconductive layer through the linear charging electrodes, and substantially increasing the readout efficiency.

However, even when the transmittances and widths of the linear charging electrodes and the light-entrance electrodes satisfy a predetermined condition for preventing light-induced discharge (light readout) in the mid-width portion of each linear charging electrode, the light-induced discharge is likely to occur in the near-edge portions of each linear charging electrode since the electric field concentrates in the near-edge portions due to the edge effect. Therefore, the readout efficiency can decrease even when the transmittances and widths of the linear charging electrodes and the light-entrance electrodes satisfy the above predetermined condition. In order to decrease the probability of occurrence of the light-induced discharge, thicknesses of the near-edge portions of each linear charging electrode can be increased, or the near-edge portions of each linear charging electrode can be rounded off. However, in this case, the manufacturing process becomes more complex, and the manufacturing cost increases.

In order to satisfy the above predetermined condition, the light-entrance electrodes and the linear charging electrodes must be made of different materials. Therefore, the construction of the electrodes becomes complex. In addition, it is not easy to form electrodes with different materials within the same layer. Further, when electrodes of different materials are formed within the same layer, the manufacturing process becomes more complex, and the manufacturing cost further increases.

SUMMARY OF THE INVENTION

An object of the present invention is to provide an image detector which comprises light-entrance electrodes and linear charging electrodes, and can substantially increase the readout efficiency.

Another object of the present invention is to provide an image detector which comprises light-entrance electrodes and linear charging electrodes, can substantially increase the readout efficiency, and is easy to produce.

According to the present invention, there is provided an image detector comprising a recording-side photoconductive layer, a reading-side photoconductive layer, a charge storage region, and a pair of electrode layers. The recording-side photoconductive layer generates latent-image charges and exhibits conductivity when the recording-side photoconductive layer is exposed to first electromagnetic radiation for recording an image. The reading-side photoconductive layer generates charges and exhibits conductivity when the reading-side photoconductive layer is exposed to second electromagnetic radiation for reading an image. The charge storage region is formed between the recording-side photoconductive layer and the reading-side photoconductive layer, and stores the latent-image charges. The pair of electrode layers are arranged to sandwich the recording-side photoconductive layer and the reading-side photoconductive layer, and apply an electric field to the recording-side photoconductive layer and the reading-side photoconductive layer. One of the pair of electrode layers located near to the reading-side photoconductive layer comprises a plurality of first linear electrodes which are transparent to the second electromagnetic radiation, and arranged parallel to each other, and a plurality of second linear electrodes each of which corresponds to at least one of the plurality of first linear electrodes, is arranged parallel to the at least one of the plurality of first linear electrodes, and outputs an electric signal corresponding to the amount of the latent-image charges when the at least one of the plurality of first linear electrodes is scanned with the second electromagnetic radiation. The image detector further comprises means for making a first strength of irradiation of each of the plurality of second linear electrodes with the second electromagnetic radiation smaller than a second strength of irradiation of at least one of the plurality of first linear electrodes corresponding to the second linear electrode with the second electromagnetic radiation.

In the above description of the present invention, the term "electromagnetic radiation" is used in its broadest sense, and includes light, X rays, gamma rays, and any other electromagnetic waves having shorter or longer wavelengths.

Since the above means is provided in the image detector according to the present invention, the strength of irradiation of the plurality of second linear electrodes (which are provided for reading out the electric signal corresponding to the amount of the latent-image charges) with the second electromagnetic radiation (i.e., reading light) can be decreased, and it is therefore possible to avoid the decrease in the readout efficiency caused by the edge effect produced in the near-edge portions of each of the plurality of second linear electrodes. In addition, the above decrease in the strength of irradiation of the plurality of second linear electrodes can be achieved without specially processing the first and second electrodes. Therefore, the manufacturing process does not become complex, and the manufacturing cost does not increase.

Preferably, the image detector according to the present invention also has one or any possible combination of the following additional features (i) to (v).

(i) The above means may be realized by a plurality of shading films arranged to shade the plurality of second linear electrodes from the second electromagnetic radiation. Since, in this case, the plurality of second linear electrodes are shaded from the second electromagnetic radiation, the plurality of first linear electrodes and the plurality of second linear electrodes can be made of an identical material, and thus the image detector which achieves high readout efficiency can be manufactured easily.

(ii) The first strength and the second strength may satisfy a relationship, $U_b/U_c \geq 5$, where $U_b$ represents the first strength, and $U_c$ represents the second strength. More preferably, the first strength and the second strength satisfy a relationship, $U_b/U_c \geq 8$. Further preferably, the first strength and the second strength satisfy a relationship, $U_b/U_c \geq 12$.

(iii) In the image detector having the feature (i), when each of the plurality of second linear electrodes has a width $W_c$, each of the shading films has a width $W_d$, and a gap $W_{bc}$ exists between each second linear electrode and each of at least one of the plurality of first linear electrodes corresponding to the second linear electrode, the width $W_c$, the width $W_d$, and the gap $W_{bc}$ may satisfy a condition, $$W_c \leq W_d \leq (W_c + 2 \times W_{bc}). \tag{1}$$

This condition indicates that each of the shading films completely covers the corresponding one of the plurality of second linear electrodes, and a gap corresponding to at least the width $W_b$ of each of the plurality of first linear electrodes is secured between adjacent electrodes of the shading films so that the reading light can pass through the gap, and the full width of each of the plurality of first linear electrodes is exposed to the second electromagnetic radiation.

(iv) In the image detector having the feature (i), when each of the plurality of second linear electrodes has a width $W_c$, each of the shading films has a width $W_d$, and a gap $W_{bc}$ exists between each second linear electrode and each of at least one of the plurality of first linear electrodes corresponding to the second linear electrode, the width $W_c$, the width $W_d$, and the gap $W_{bc}$ may satisfy a condition, $$(W_c + W_{bc}/2) \leq W_d \leq (W_c + W_{bc}). \tag{2}$$

(v) When each of the plurality of first linear electrodes has a width $W_b$ and a transmittance $P_b$ for the second electromagnetic radiation, and each of the plurality of second linear electrodes has a width $W_c$ and a transmittance $P_c$ for the second electromagnetic radiation, the widths $W_b$ and $W_c$ and the transmittances $P_b$ and $P_c$ may satisfy a condition, $$(W_b \times P_b)/(W_c + P_c) \geq 5. \tag{3}$$

More preferably, the widths $W_b$ and $W_c$ and the transmittances $P_b$ and $P_c$ satisfy a condition, $$(W_b \times P_b)/(W_c + P_c) \geq 8.$$

Further preferably, the widths $W_b$ and $W_c$ and the transmittances $P_b$ and $P_c$ satisfy a condition, $$(W_b \times P_b)/(W_c + P_c) \geq 12.$$

When one of the above condition (3), the more preferable condition, and the further preferable condition is satisfied, the readout efficiency can be further increased.

The charge storage region can be formed as follows.

(a) The charge storage region can be formed at the boundary between the charge transport layer and the recording-side photoconductive layer, as disclosed in the coassigned U.S. patent application, Ser. No. 09/404,371 (and the corresponding Japanese Unexamined Patent Publication No. 2000-162726) and the coassigned U.S. patent application, Ser. No. 09/539,412 (and the corresponding Japanese Unexamined Patent Publication No. 2000-284056).

(b) A trap layer may be provided. In this case, the charge storage region can be formed in the trap layer or at the boundary between the trap layer and the recording-side photoconductive layer, as disclosed in the U.S. Pat. No. 4,535,468.

(c) Microplates (minute conductive members) may be provided for collecting and storing the latent-image charges, as disclosed in the coassigned U.S. patent application, Ser. No. 09/538,479 (and the corresponding Japanese Unexamined Patent Publication No. 2000-284057).

A radiographic image can be recorded in and read out from the image detector according to the present invention by using the conventional recording and reading methods and circuits, for example, as explained in the coassigned U.S. patent application, Ser. No. 09/538,479 (and the corresponding Japanese Unexamined Patent Publication No. 2000-284057).

DESCRIPTION OF PREFERRED EMBODIMENTS

Embodiments of the present invention are explained in detail below with reference to drawings.

First Embodiment

Figure 1A:
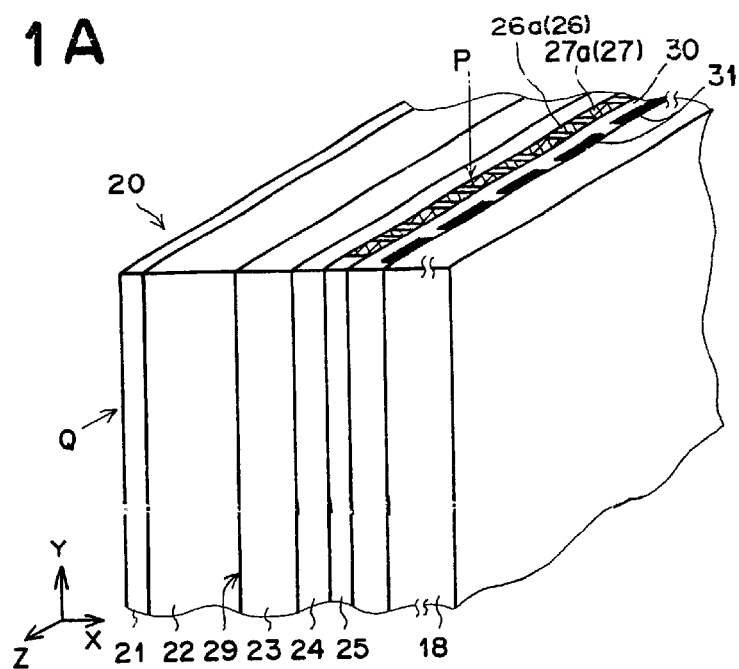
FIG. 1A is a perspective view of a portion of a solid-state radiographic image detector as a first embodiment of the present invention.
Figure 1B:
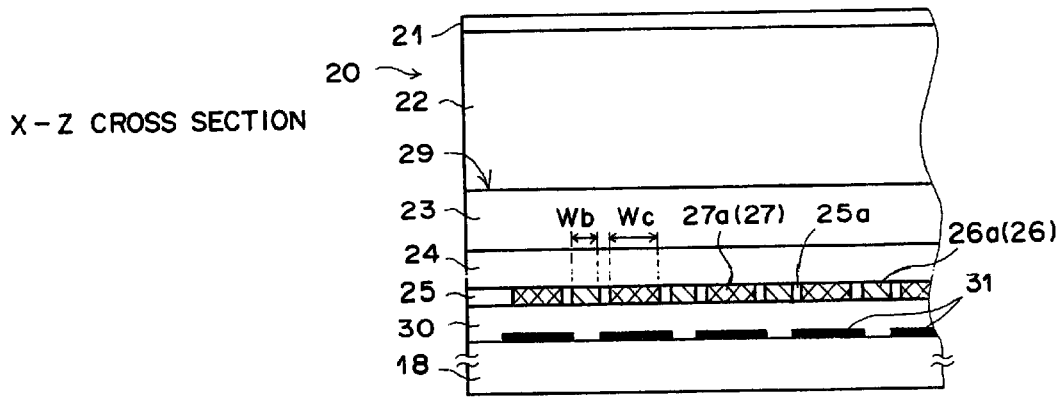
FIG. 1B is a cross-sectional view of the portion of the solid-state radiographic image detector of FIG. 1A, where an X-Z cross section at the position indicated by the arrow Q in FIG. 1A is illustrated.
Figure 1C:
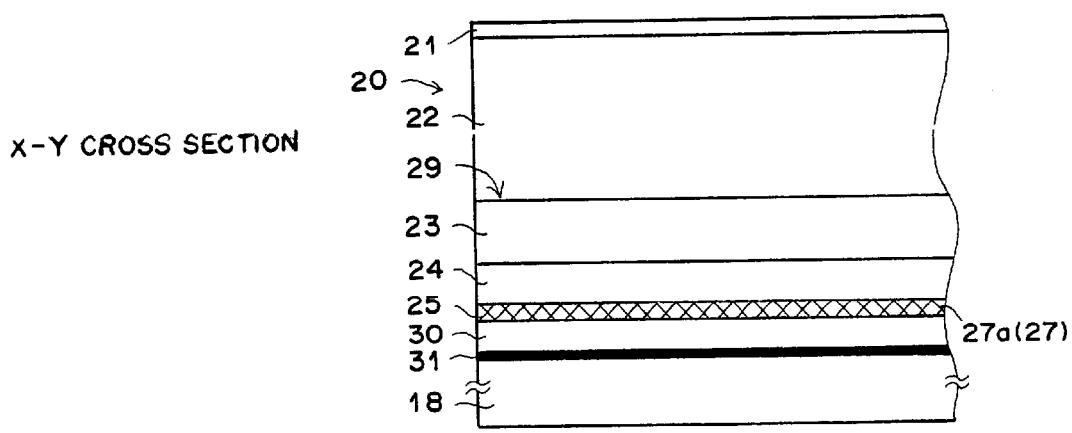
FIG. 1C is another cross-sectional view of the portion of the solid-state radiographic image detector of FIG. 1A, where an X-Y cross section at the position indicated by the arrow P indicated in FIG. 1A is illustrated.

FIG. 1A a perspective view of a portion of a solid-state radiographic image detector as the first embodiment of the present invention, FIG. 1B illustrates an X-Z cross section of the portion of the solid-state radiographic image detector of FIG. 1A at the position indicated by the arrow Q in FIG. 1A, and FIG. 1C illustrates an X-Y cross section at the position of the portion of the solid-state radiographic image detector of FIG. 1A indicated by the arrow P indicated in FIG. 1A.

The solid-state radiographic image detector 20 illustrated in FIGS. 1A to 1C comprises a recording-side electrode layer 21, a recording-side photoconductive layer 22, a charge transport layer 23, a reading-side photoconductive layer 24, a reading-side electrode layer 25, an insulation layer 30, and a support 18, formed in this order.

The recording-side electrode layer 21 is transparent to recording light which carries image information. For example, the recording light is realized by X rays which have passed through an object. The recording-side photoconductive layer 22 is exposed to the recording light which has passed through the recording-side electrode layer 21, and generates pairs of opposite charges (including latent-image charges) and exhibits conductivity in response to the exposure to the recording light. The charge transport layer 23 behaves as almost an insulator against charge carriers having the aforementioned latent-image polarity (i.e., the same polarity as the latent-image charges), and behaves as almost a conductor of charge carriers having the aforementioned transport polarity (i.e., a polarity opposite to the latent-image polarity). For example, the latent-image polarity is negative, and the transport polarity is positive. The reading-side photoconductive layer 24 generates charges and exhibits conductivity when the reading-side photoconductive layer 24 is exposed to reading light. The reading-side electrode layer 25, the insulation layer 30, and the support 18 are transparent to the reading light.

A charge storage region 29 is formed and two-dimensionally extends at the boundary between the recording-side photoconductive layer 22 and the charge transport layer 23. The charge storage portion 29 temporarily holds (stores) the latent-image charges which are generated in the recording-side photoconductive layer 22, and represent the image information.

For example, the solid-state radiographic image detector 20 has a size (area) of 20×20 cm or greater. In particular, in the case of breast X-ray imaging, it is preferable that the effective size of the solid-state radiographic image detector 20 is about 43×43 cm.

The support 18 can be a glass plate or the like which is transparent to the reading light. In addition, it is preferable that the support 18 is made of a material having a thermal expansion coefficient relatively close to the thermal expansion coefficient of the material constituting the reading-side photoconductive layer 24. For example, when the reading-side photoconductive layer 24 is made of a-Se (amorphous selenium), the support 18 is preferably made of a material having a thermal expansion coefficient of $1.0\times10^{-5}$ to $10.0\times10^{-5}$/K at 40° C., and more preferably $4.0\times10^{-5}$ to $8.0\times10^5$/K at 40° C., since the thermal expansion coefficient of selenium is $3.68\times10^{-5}$/K at 40° C. Organic polymers such as polycarbonate and polymethyl methacrylate (PMMA) are examples of the material having a thermal expansion coefficient in the above range. When the support 18 is made of a material having a thermal expansion coefficient in the above range, the thermal expansion coefficients of the support 18 and the reading-side photoconductive layer 24 match well. When the thermal expansion coefficients of the support 18 and the reading-side photoconductive layer 24 do not match well, and the solid-state radiographic image detector is subject to great temperature variations due to severe environment, for example, during shipment in cold climates, great thermal stress is produced at the boundary between the support 18 and the reading-side photoconductive layer 24, and the solid-state radiographic image detector is likely to break due to the difference in the thermal expansion coefficient. For example, the reading-side photoconductive layer 24 may be separated from the support 18 by exfoliation, or either of the reading-side photoconductive layer 24 and the support 18 may break. However, when the thermal expansion coefficients of the support 18 and the reading-side photoconductive layer 24 match well, it is possible to prevent the failure of the solid-state radiographic image detector caused by the difference in the thermal expansion coefficient. Further, the organic polymers can withstand a greater impact than the glass plate.

It is appropriate that the recording-side photoconductive layer 22 is made of a photoconductive material containing as a main component at least one of a-Se, lead (II) oxides such as Pbo, lead (II) iodides such as $PbI_2$, $Bi_{12}$ (Ge, Si)$O_{20}$, $Bi_2I_3$/organic polymer nano-composite, and the like.

The greater the difference in mobility in a material constituting the charge transport layer 23 between the negative charge carriers stored in the charge storage portion 29 and the positive charge carriers, the more appropriate for the charge transport layer 23 the material is. When the difference is expressed by the ratio between the positive and negative charge carriers, the ratio is preferably $10^2$ or greater, and more preferably $10^3$ or greater. It is thus appropriate that the charge transport layer 23 is made of an organic compound (such as poly-N-vinyl carbazole (PVK), N,N'-diphenyl-N, N'-bis(3methylphenyl)-[1,1'-biphenyl]-4,4'-diamine (TPD), and discotic liquid crystals), a TPD-dispersed polymer, i.e., a polymer (such as polycarbonate, polystyrene, and PUK) in which TPD is dispersed, a semiconductor material such as a-Se doped with 10 to 200 ppm Cl, or the like. In particular, it is preferable to form the charge transport layer 23 with the organic compound since the organic compound is insensitive to light, i.e., the organic compound does exhibit almost no conductivity even when the organic compound is exposed to the recording light or the reading light. In addition, since the permittivity of the organic compound is generally small, the capacitances of the charge transport layer 23 and the reading-side photoconductive layer 24 are small, and it is therefore possible to increase the signal readout efficiency.

It is appropriate that the reading-side photoconductive layer 24 is made of a photoconductive material containing as a main component at least one of a-Se, Se—Te, Se—As—Te, nonmetallic phthalocyanine, metallic phthalocyanine, MgPc (magnesium phthalocyanine), VoPc (phase II of vanadyl phthalocyanine), cupc (copper phthalocyanine), and the like.

In order to efficiently absorb the recording light, the thickness of the recording-side photoconductive layer 22 is preferably 50 to 1,000 micrometers.

Preferably, the sum of the thicknesses of the charge transport layer 23 and the reading-side photoconductive layer 24 does not exceed one-half of the thickness of the recording-side photoconductive layer 22. In addition, since the responsiveness in the readout operation increases with decrease in the sum of the thicknesses of the charge transport layer 23 and the reading-side photoconductive layer 24, it is preferable that the sum of the thicknesses of the charge transport layer 23 and the reading-side photoconductive layer 24 does not exceed one-tenth of the thickness of the recording-side photoconductive layer 22, and it is more preferable that the sum of the thicknesses of the charge transport layer 23 and the reading-side photoconductive layer 24 does not exceed one-hundredth of the thickness of the recording-side photoconductive layer 22.

The above materials of the respective layers of the solid-state radiographic image detector 20 are suitable for negatively charging the recording-side electrode layer 21, positively charging the reading-side electrode layer 25, storing negative charges as latent-image charges in the charge storage region 29 formed at the interface between the recording-side photoconductive layer 22 and the charge transport layer 23, and making the charge transport layer 23 function as a positive-hole transport layer, in which the mobility of the positive charge carriers as the transport charge carriers is greater than the mobility of the negative charge carriers as the latent-image charge carriers. However, in a variation of the solid-state radiographic image detector, the polarities of the above charges can be reversed. Only a small change is required for reversing the polarities of the above charges, and the small change includes a change of the charge transport layer 23 from the positive-hole transport layer to an electron transport layer, in which the mobility of the negative charge carriers as the transport charge carriers is greater than the mobility of the positive charge carriers as the latent-image charge carriers. That is, in the case where the polarities of the charges can be reversed, the recording-side photoconductive layer 22 can also be made of a photoconductive material containing as a main component at least one of a-Se, lead (II) oxides such as PbO, lead (II) iodides such as $PbI_2$, $Bi_{12}(Ge, Si) O_{20}$, $Bi_2I_3$/organic polymer nano-composite, and the like. In addition, nonmetallic phthalocyanine and metallic phthalocyanine can also be used for forming the reading-side photoconductive layer 24 in a similar manner to the aforementioned case where the polarities of the charges are not reversed. Further, it is appropriate that the charge transport layer 23 is made of one of N-trinitrofluorenylidene aniline derivatives, a TNF-dispersed polyester, i.e., polyester in which trinitrofluorenone (TNF) is dispersed, and asymmetric diphenoquinone derivatives.

Although the charge storage region 29 is formed at the boundary between the recording-side photoconductive layer 22 and the charge transport layer 23 in the solid-state radiographic image detector 20 illustrated in FIGS. 1A to 1C, in another variation of the solid-state radiographic image detector, the charge storage region 29 may be realized by providing a trap layer which traps and stores the latent-image charges as disclosed in U.S. Pat. No. 4,535,468.

In each of the solid-state radiographic image detector 20 illustrated in FIGS. 1A to 1C and the above variations, the aforementioned striped electrode array is formed on the support which is transparent to the reading light, and a bus line made of a material exhibiting conductivity higher than the linear electrodes which constitute the striped electrode array is arranged along each of the linear electrodes in contact with each of the linear electrodes.

The recording-side electrode layer 21 and the reading-side electrode layer 25 can be formed in any ways as far as the recording-side electrode layer 21 and the reading-side electrode layer 25 are transparent to the recording light and the reading light, respectively. For example, an electrode layer transparent to the recording light can be realized by forming a transparent metal-oxide layer having a thickness of about 50 to 200 nm (preferably 100 nm or greater), and the metal oxide layer can be an $SnO_2$ film (which is known as a NESA film), an ITO (indium tin oxide) film, a film of IDIXO (Idemitsu Indium X-metal Oxide), or the like, where IDIXO is a transparent amorphous metal oxide, which is easily etched, and manufactured by Idemitsu Kosan Co., Ltd. Alternatively, when a film which has a thickness not exceeding 20 nm and being preferably about 10 nm is formed with pure metal such as aluminum, gold, molybdenum, and chromium, the film is transparent to visible light. In either case, it is possible to achieve transmittance of 50% or greater for visible light as the reading light.

When X rays are used as the recording light, i.e., an image is recorded in the image detector by applying X rays to the recording-side photoconductive layer 22 through the recording-side electrode layer 21, the recording-side electrode layer 21 is not required to be transparent to visible light. Therefore, in this case, the recording-side electrode layer 21 can be a film being made of pure metal (e.g., aluminum, gold) and having a thickness of, for example, 100 nm.

Light-entrance electrodes in the reading-side electrode layer 25 are realized by a striped electrode array 26 comprised of a plurality of elements (linear electrodes) 26a formed with a pitch corresponding to a pixel pitch in a striped arrangement. In order to maintain high sharpness and achieve high S/N ratios in medical radiography, the pixel pitch is designed to be about 50 to 250 micrometers, and the width of each of the linear electrodes 26a is designed to be about 10 to 200 micrometers within the pixel pitch. The light-entrance electrodes are realized by the striped electrode array 26 for the purpose of enabling easy correction of structural noise, increasing the image S/N ratios by reduction of load capacitance, and reducing readout time by parallel readout (principally in the main scanning direction).

In the reading-side electrode layer 25, a charging electrode array 27 comprised of a plurality of elements (linear charging electrodes) 27a is provided. The linear charging electrodes 27a are conductive members formed in a striped arrangement, and each of the linear charging electrodes 27a is provided for outputting an electric signal corresponding to the amount of latent-image charges stored in each area (corresponding to a pixel) of the charge storage region 29 which is formed at or near the boundary between the recording-side photoconductive layer 22 and the charge transport layer 23. The linear charging electrodes 27a are arranged parallel to and alternately with the linear electrodes 26a.

For example, the linear charging electrodes 27a can be realized by an aluminum film having a thickness of 100 nm, a molybdenum film having a thickness of 100 nm, a chromium film having a thickness of 100 nm, or the like. When the linear charging electrodes 27a are realized by one of the above films, the transmittance $P_c$ of the reading light through the linear charging electrodes 27a can be made 10% or less, i.e., the linear charging electrodes 27a can shade portions of the reading-side photoconductive layer 24 located behind the linear charging electrodes 27a from the reading light. That is, it is possible to prevent generation of pairs of charges relating to the electric signal read out from the image detector, in the portions of the reading-side photoconductive layer 24 located behind the linear charging electrodes 27a.

A predetermined distance is kept between each linear electrode 26a and adjacent linear charging electrodes 27a in order to insulate the linear electrodes 26a and the linear charging electrodes 27a from each other, and spaces 25a between the linear electrodes 26a and the linear charging electrodes 27a are filled with a nonconductive high-polymer material, which shades portions of the reading-side photoconductive layer 24 located behind the nonconductive high-polymer material from the reading light. The nonconductive high-polymer material is, for example, pigment-dispersed polyethylene, i.e., polyethylene in which a pigment such as carbon black is dispersed.

In addition, the width $W_c$ of each linear charging electrode 27a is greater than the width $W_b$ of each linear electrode 26a. Further, the widths $W_b$ and $W_c$, the transmittance $P_b$ of the reading light through each linear electrode 26a, and the transmittance $P_c$ of the reading light through each linear charging electrode 27a are determined so as to satisfy the aforementioned condition (3), $$(W_b \times P_b)/(W_c \times P_c) \geq 5.$$

When a latent image is recorded, the linear charging electrodes 27a widened as above are utilized by connecting the linear charging electrodes 27a to the linear electrodes 26a. When a latent image is recorded while connecting the linear charging electrodes 27a to the linear electrodes 26a, latent-image charges are stored in areas of the charge storage region 29 corresponding to the linear charging electrodes 27a as well as areas corresponding to the linear electrodes 26a. Accordingly, when an area of the reading-side photoconductive layer 24 corresponding to one of the linear electrodes 26a is exposed to the reading light through the one of the linear electrodes 26a, signal charges corresponding to latent-image charges stored in portions of the reading-side photoconductive layer 24 located above two of the linear charging electrodes 27a adjacent to the one of the linear electrodes 26a are read out as well as signal charges corresponding to latent-image charges stored in a portion of the reading-side photoconductive layer 24 located above the one of the linear electrodes 26a. Therefore, the position of each linear electrode 26a corresponds to a pixel center, and the one of the linear electrodes 26a and the half area of each of the two of the linear charging electrodes 27a adjacent to the one of the linear electrodes 26a correspond to one pixel.

Further, a plurality of shading films 31 made of a material having low transmittance are arranged on areas of the support 18 corresponding to the respective linear charging electrodes 27a so that the irradiation strength of each of the linear charging electrodes 27a is lower than the irradiation strength of each of the linear electrodes 26a. The shading films 31 are not necessarily made of an insulator, and can be made of a material having a resistivity of $2 \times 10^{-6}$ Ω·cm or greater (and more preferably between $2 \times 10^{-6}$ Ω·cm and $1 \times 10^{15}$ Ω·cm). When the shading films 31 are made of metal, the metal can be aluminum, molybdenum, chromium, or the like. When the shading films 31 are made of an inorganic compound, the inorganic compound can be $MOS_2$, $WSi_2$, TiN, or the like. Further, it is more preferable that the resistivity of the shading films 31 is 1 Ω·cm or greater.

When the shading films 31 are made of a conductive material, an insulator is arranged between the shading films 31 and the linear charging electrodes 27a in order to prevent immediate contact between the shading films 31 and the linear charging electrodes 27a. In the present embodiment, the above insulator is realized by the insulation layer 30 formed between the reading-side electrode layer 25 and the support 18. For example, the insulation layer 30 is made of $SiO_2$ or the like, and has a thickness of 0.01 to 10 micrometers, preferably 0.1 to 1 micrometers, and more preferably about 0.5 micrometers.

In addition, the thickness of each of the shading films 31 preferably satisfies the condition, $U_b/U_c \geq 5$, more preferably $U_b/U_c \geq 8$, and further preferably $U_b/U_c \geq 12$, where $U_b$ is the irradiation strength of the linear electrodes 26a, and $U_c$ is the irradiation strength of the linear charging electrodes 27a.

Further, it is preferable that the width $W_d$ of each of the shading films 31 satisfies the aforementioned condition (1), $$W_c \leq W_d \leq (W_c + 2 \times W_{bc}),$$

where $W_{bc}$ is a gap between the adjacent electrodes among the linear electrodes 26a and the linear charging electrodes 27a. This condition indicates that each of the shading films 31 completely covers the corresponding one of the linear charging electrodes 27a, and a gap corresponding to at least the width $W_b$ of each of the linear electrodes 26a is secured between adjacent ones of the shading films 31 so that the reading light can pass through the gap, and the full width of each of the linear electrodes 26a is exposed to the reading light. However, when the width $W_d$ of each of the shading films 31 is equal to the width $W_c$ of each of the linear charging electrodes 27a, the shading is insufficient. On the other hand, when the above gap between adjacent ones of the shading films 31 is equal to the width $W_b$ of each of the linear electrodes 26a, the amount of the reading light which reaches each of the linear electrodes 26a may be insufficient. Therefore, it is preferable that the width $W_d$ of each of the shading films 31 satisfies the aforementioned condition (2), $$(W_c + W_{bc}/2) \leq W_d \leq (W_c + W_{bc}).$$

In the solid-state radiographic image detector 20, for each pixel, a capacitor $C_{*a}$ is formed between the recording-side electrode layer 21 and the charge storage region 29 which sandwich the recording-side photoconductive layer 22, a capacitor $C_{*b}$ is formed between the charge storage region 29 and the striped electrode array 26 which sandwich the charge transport layer 23 and the reading-side photoconductive layer 24, and a capacitor $C_{*c}$ is formed between the charge storage region 29 and the charging electrode array 27 which also sandwich the charge transport layer 23 and the reading-side photoconductive layer 24. The amounts $Q_{+a}$, $Q_{+b}$, and $Q_{+c}$ of positive charges distributed to the capacitors $C_{*a}$, $C_{*b}$, and $C_{*c}$ by the charge rearrangement before readout are proportional to the capacitances $C_a$, $C_b$, and $C_c$ of the capacitors $C_{*a}$, $C_{*b}$, and $C_{*c}$, respectively, and the total amount $Q_+$ of the positive charges distributed to the capacitors $C_{*a}$, $C_{*b}$, and $C_{*c}$ are equal to the amount $Q_{31}$ of the latent-image charges. That is, $$Q_-=Q_{30}=Q_{+a}+Q_{+b}+Q_{+c},$$

$$Q_{+a}=Q_+ \times C_a/(C_a+C_b+C_c),$$

$$Q_{+b}=Q_+ \times C_b/(C_a+C_b+C_c), \text{ and}$$

$$Q_{+c}=Q_+ \times C_c/(C_a+C_b+C_c).$$

In addition, the amount of the signal charges which can be read out from the solid-state radiographic image detector 20 is equal to the sum $(Q_{+a}+Q_{+c})$ of the amounts $Q_{+a}$ and $Q_{+c}$ of the positive charges distributed to the capacitors $C_{*a}$ and $C_{*c}$, and the amount $Q_{*b}$ of the positive charges distributed to the capacitor $C_{*b}$ cannot be read out as a portion of the signal charges for the reason explained in the coassigned U.S. patent application, Ser. No. 09/539,412 and the corresponding Japanese Unexamined Patent Publication No. 2000-284056.

The ratio $C_b/C_c$ between the capacitances $C_b$ and $C_c$ of the capacitors $C_{*b}$ and $C_{*c}$ is equal to the ratio $W_b/W_c$ between the widths $W_b$ and $W_c$ of each of the linear electrodes 26a and each of the linear charging electrodes 27a. On the other hand, the capacitances $C_a$ and $C_b$ of the capacitors $C_{*a}$ and $C_{*b}$ are not greatly affected by the provision of the charging electrode array 27. Therefore, the amount $Q_{+b}$ of the positive charges distributed to the capacitor $C_{*b}$ by the charge rearrangement can be reduced compared with the case where the charging electrode array 27 is not provided. Thus, the amount of the signal charges which can be read out from the solid-state radiographic image detector 20 through each of the linear charging electrodes 27a can be made greater than the amount of the signal charges which can be read out from the solid-state radiographic image detector 20 through each of the linear electrodes 26a in the case where the charging electrode array 27 is not provided.

Since the width $W_b$ of each of the linear electrodes 26a, the transmittance $P_b$ of the reading light through each linear electrode 26a, the width $W_c$ of each linear charging electrode $27_a$, and the transmittance $P_c$ of the reading light through each linear charging electrode 27a satisfy the aforementioned condition (3), the amount of the signal charges which can be read out from the solid-state radiographic image detector 20 can be substantially increased, and therefore the readout efficiency and the image S/N ratio can also be substantially increased.

In addition, since the shading films 31 are arranged to have such a thickness that the irradiation strength $U_b$ of the linear electrodes 26a and the irradiation strength $U_c$ of the linear charging electrodes 27a satisfy the aforementioned condition, $U_b/U_c \geq 5$, and each of the shading film 31 has such a width $W_d$ as to satisfy the aforementioned conditions (1) and (2), the edge effect can be suppressed at near-edge portions of the linear charging electrodes 27a, and the reading light which enters the reading-side photoconductive layer 24 through the linear charging electrodes 27a can be further suppressed. Thus, the amount of the signal charges which can be read out from the solid-state radiographic image detector 20 can be further increased.

Since the ratio $C_b/C_c$ between the capacitances $C_b$ and $C_c$ of the capacitors $C_{*b}$ and $C_{*c}$ is equal to the ratio $W_b/W_c$ between the widths $W_b$ and $W_c$ of each of the linear electrodes 26a and each of the linear charging electrodes 27a, the amount of the signal charges which can be read out from the solid-state radiographic image detector 20 can be increased by decreasing the ratio $W_b/W_c$ between the widths $W_b$ and $W_c$ of each of the linear electrodes 26a and each of the linear charging electrodes $27_a$. At this time, the transmittance $P_b$ of the reading light through each linear electrode 26a and the transmittance $P_c$ of the reading light through each linear charging electrode 27a satisfy the aforementioned condition (3).

Generally, in order to remove charges remaining in the solid-state radiographic image detector 20, it is preferable that the linear charging electrodes 27a are also transparent to the reading light. However, when the aforementioned conditions (1) to (3) are satisfied, the remaining charges can be removed while maintaining the readout efficiency and the image S/N ratio.

Second Embodiment

Figure 2A:
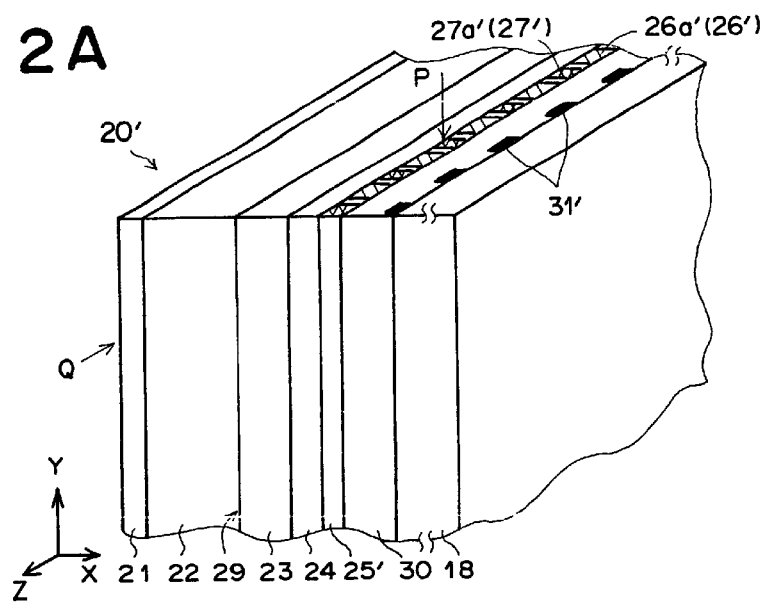
FIG. 2A is a perspective view of a portion of a solid-state radiographic image detector as a second embodiment of the present invention.
Figure 2B:
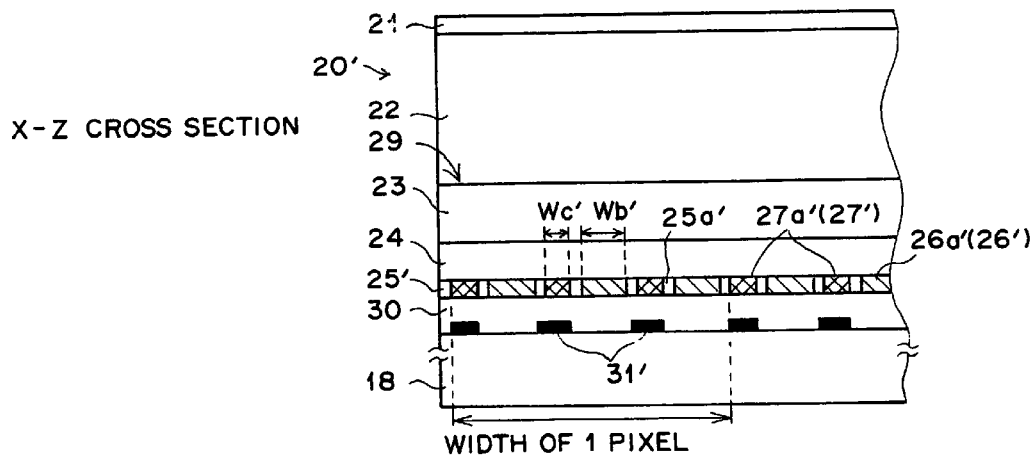
FIG. 2B is a cross-sectional view of the portion of the solid-state radiographic image detector of FIG. 2A, where an X-Z cross section at the position indicated by the arrow Q in FIG. 2A is illustrated.
Figure 2C:
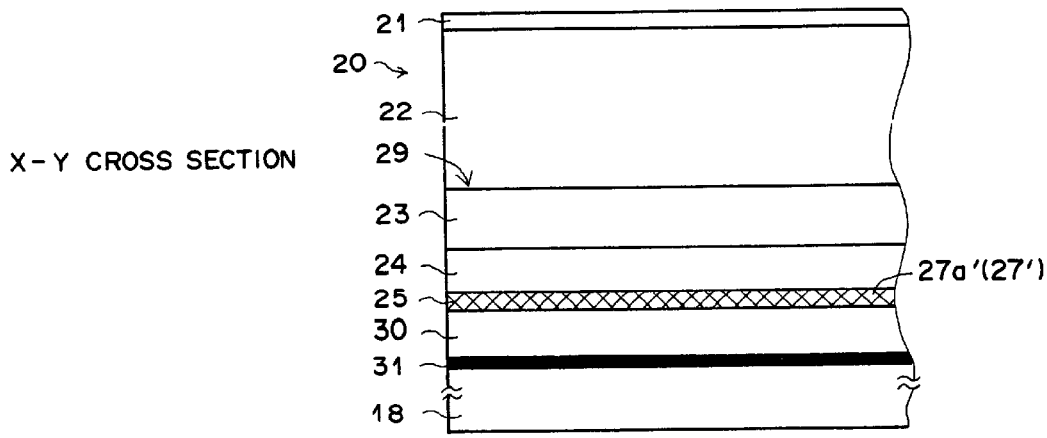
FIG. 2C is another cross-sectional view of the portion of the solid-state radiographic image detector of FIG. 2A, where an X-Y cross section at the position indicated by the arrow P indicated in FIG. 2A is illustrated.

FIG. 2A is a perspective view of a portion of a solid-state radiographic image detector as the second embodiment of the present invention, FIG. 2B illustrates an X-Z cross section of the portion of the solid-state radiographic image detector of FIG. 2A at the position indicated by the arrow Q in FIG. 2A, and FIG. 2C illustrates an X-Y cross section at the position of the portion of the solid-state radiographic image detector of FIG. 2A indicated by the arrow P indicated in FIG. 2A. The solid-state radiographic image detector 20' illustrated in FIGS. 2A to 2C is identical to the solid-state radiographic image detector 20 illustrated in FIGS. 1A to 1C except for the features explained below. In FIGS. 2A to 2C, elements having the same reference numbers as FIGS. 1A to 1C have the same functions as the corresponding elements in FIGS. 1A to 1C.

In the solid-state radiographic image detector 20' illustrated in FIGS. 2A to 2C, a plurality of linear electrodes 26a' and a plurality of linear charging electrodes 27a' are alternately arranged within a width of each pixel. In the example illustrated in FIGS. 2A to 2C, three linear electrodes 26a' and three linear charging electrodes 27a' are alternately arranged within a width of each pixel. The linear electrodes 26a' have an identical transmittance $P_b$, and the linear charging electrodes 27a' have an identical transmittance $P_c$.

It is appropriate to perform each of recording and reading-out operations pixel by pixel. When the pixel size in the second embodiment is identical to the pixel size in the first embodiment, the width $W_b'$ of each of the linear electrodes 26a' and the width $W_c'$ of each of the linear charging electrodes 27a' must be reduced according to the above arrangement of the linear electrodes 26a' and the linear charging electrodes 27a'. In this case, the ratio between the sum of widths $W_b'$ of the linear electrodes 26a' and the sum of widths $W_c'$ of the linear charging electrodes 27a' within each pixel is identical to the ratio between the width W$b'$ of each of the linear electrodes 26a' and the width W$c'$ of each of the linear charging electrodes 27a'. In addition, as mentioned above, the linear electrodes 26a' have an identical transmittance $P_b$, and the linear charging electrodes 27a' have an identical transmittance $P_c$. Therefore, when the transmittance P$b'$ of the reading light through each linear electrode 26a' and the transmittance $P_c'$ of the reading light through each linear charging electrode 27a' satisfy the condition, $(W_b' \times P_b')/(W_c' \times P_c') \geq 5$, the amount of the signal charges which can be read out from the solid-state radiographic image detector 20' can be substantially increased for the same reason as the first embodiment. Thus, the readout efficiency and the image S/N ratio can also be substantially increased.

Further, when the width $W_d'$ of each of the shading films 31' and the gap $W_{bc}'$ between the adjacent electrodes among the linear electrodes 26a' and the linear charging electrodes 27a' satisfy the following conditions (1') or (2'), the edge effect can be suppressed at near-edge portions of the linear charging electrodes 27a', and the reading light which enters the reading-side photoconductive layer 24 through the linear charging electrodes 27a' can be further suppressed.

$$W_c' \leq W_d' \leq (W_c' + 2 \times W_{bc}'), \quad (1')$$

$$(W_c' + W_{bc}'/2) \leq W_d' \leq (W_c' + W_{bc}'), \quad (2')$$

Thus, the amount of the signal charges which can be read out from the solid-state radiographic image detector 20' can be further increased.

Variations and Other Matters (i) In the first and second embodiments, the solid-state radiographic image detector 20 (or 20'), the striped electrode array 26 (26') and the charging electrode array 27 (27') are made of different materials, respectively, so that the linear electrodes 26a (26a') are transparent to reading light, and the linear charging electrodes 27a (27a') shade the portions of the reading-side photoconductive layer 24 located behind the linear charging electrodes 27a (27a') from the reading light. However, it is not easy to form electrodes made of different materials within the same layer. In addition, when electrodes made of different materials are formed within the same layer, the manufacturing process becomes more complex, and the manufacturing cost increases.

Nevertheless, when the aforementioned condition (1) or (2) (or (1') or (2')) is satisfied, the striped electrode array 26 (26') and the charging electrode array 27 (27') can be made of an identical material, i.e., the linear charging electrodes 27a (27a') can also be made of a material transparent to the reading light, since the shading films 31 (31') can suppress the reading light which passes through the linear charging electrodes 27a (27a') so as to prevent generation of pairs of charges in the portions of the reading-side photoconductive layer 24 located behind the linear charging electrodes 27a (27a'). Therefore, the amount of the signal charges which can be read out from the solid-state radiographic image detector 20 (or 20') can be substantially increased, and the solid-state radiographic image detector 20 (or 20') can be manufactured by a simple process.

(ii) The recording-side photoconductive layers which are used in the image detectors according to the present invention are not limited to recording-side photoconductive layers which exhibit conductivity when the recording-side photoconductive layers are exposed to radiation for recording. For example, recording-side photoconductive layers which exhibit conductivity when the recording-side photoconductive layers are exposed to light which is emitted by excitation of a material with radiation, as disclosed in the coassigned U.S. patent application, Ser. No. 09/404,371 and the corresponding Japanese Unexamined Patent Publication No. 2000-162726. In this case, a wavelength conversion layer, for example, a so-called an X-ray scintillator, may be formed on the surface of the recording-side electrode layer, where the X-ray scintillator converts X rays into light (e.g., blue light) in a wavelength range other than the X-ray wavelength range. A preferable example of a material constituting the wavelength conversion layer is cesium iodide (CsI). In this case, the recording-side electrode layer is made of a material which is transparent to the above light (e.g., blue light) in the wavelength range other than the X-ray wavelength range.

(iii) In the image detectors as the first and second embodiments of the present invention, a charge transport layer is arranged between the recording-side photoconductive layer and the reading-side photoconductive layer, and a charge storage region is formed at the boundary between the recording-side photoconductive layer and the charge transport layer. However, the charge transport layer can be replaced with the trap layer as disclosed in U.S. Pat. No. 4,535,468. In this case, and the latent-image charges are trapped and stored in the trap layer or at the boundary between the trap layer and the recording-side photoconductive layer. In addition, microplates (which are disclosed in, for example, the coassigned U.S. patent application, Ser. No. 09/539,412 and the corresponding Japanese Unexamined Patent Publication No. 2000-284056) may be arranged corresponding to the respective pixels at the boundary between the trap layer and the recording-side photoconductive layer. Alternatively, the charge storage region can be realized by arranging the microplates instead of providing the charge transport layer or the trap layer.

(iv) Although the above descriptions are provided for the preferred embodiments of the present invention, the scope of the present invention is not limited to such embodiments. Various modifications and changes are possible within the scope of the invention.

What is claimed is:

1. An image detector comprising:

a recording-side photoconductive layer which generates latent-image charges and exhibits conductivity when said recording-side photoconductive layer is exposed to first electromagnetic radiation for recording an image;

a reading-side photoconductive layer which generates charges and exhibits conductivity when said reading-side photoconductive layer is exposed to second electromagnetic radiation for reading an image;

a charge storage region which is formed between said recording-side photoconductive layer and said reading-side photoconductive layer, and stores said latent-image charges;

a pair of electrode layers which are arranged to sandwich said recording-side photoconductive layer and said reading-side photoconductive layer, and apply an electric field to said recording-side photoconductive layer and said reading-side photoconductive layer, where one of said pair of electrode layers located near to said reading-side photoconductive layer comprises, a plurality of first linear electrodes which are transparent to said second electromagnetic radiation, and arranged parallel to each other, and a plurality of second linear electrodes each of which corresponds to at least one of said plurality of first linear electrodes, is arranged parallel to said at least one of said plurality of first linear electrodes, and outputs an electric signal corresponding to an amount of said latent-image charges when said at least one of said plurality of first linear electrodes is scanned with said second electromagnetic radiation; and means for making a first strength of irradiation of each of said plurality of second linear electrodes with said second electromagnetic radiation smaller than a second strength of irradiation of at least one of said plurality of first linear electrodes corresponding to said each of said plurality of second linear electrodes with said second electromagnetic radiation.

2. An image detector according to claim 1, wherein said means is realized by a plurality of shading films arranged to shade said plurality of second linear electrodes from said second electromagnetic radiation.

3. An image detector according to claim 2, wherein each of said plurality of second linear electrodes has a width $W_c$, each of said shading films has a width $W_d$, a gap $W_{bc}$ exists between each of said plurality of second linear electrodes and each of at least one of said plurality of first linear electrodes corresponding to said each of said plurality of second linear electrodes, and said width $W_c$, said width $W_d$, and said gap $W_{bc}$ satisfy a relationship, $$W_c \leq W_d \leq (W_c + 2 \times W_{bc}).$$

4. An image detector according to claim 2, wherein each of said plurality of second linear electrodes has a width $W_c$, each of said shading films has a width $W_d$, a gap $W_{bc}$ exists between each of said plurality of second linear electrodes and each of at least one of said plurality of first linear electrodes corresponding to said each of said plurality of second linear electrodes, and said width $W_c$, said width $W_d$, and said gap $W_{bc}$ satisfy a relationship, $$(W_c + W_{bc}/2) \leq W_d \leq (W_c + W_{bc}).$$

5. An image detector according to claim 1, wherein said first strength and said second strength satisfy a relationship, $U_b/U_c \geq 5$, where $U_b$ represents said first strength, and $U_c$ represents said second strength.

6. An image detector according to claim 1, wherein each of said plurality of first linear electrodes has a width $W_b$ and a transmittance $P_b$ for said second electromagnetic radiation, each of said plurality of second linear electrodes has a width $W_c$ and a transmittance $P_c$ for said second electromagnetic radiation, and said width $W_b$, said width $W_c$, said transmittance $P_b$, and said transmittance $P_c$ satisfy a relationship, $(W_b \times P_b)/(W_c + P_c) \leq 5$.

* * * * *